(12) United States Patent
Lee et al.

(10) Patent No.: US 7,592,095 B2
(45) Date of Patent: Sep. 22, 2009

(54) LITHIUM SECONDARY BATTERY CONTAINING CAPSULE FOR CONTROLLED-RELEASE OF ADDITIVES

(75) Inventors: Hochun Lee, Daejeon (KR); Hyeongjin Kim, Daejeon (KR)

(73) Assignee: LG Chem, Ltd. (KR)

( * ) Notice: Subject to any disclaimer, the term of this patent is extended or adjusted under 35 U.S.C. 154(b) by 289 days.

(21) Appl. No.: 11/484,931

(22) Filed: Jul. 12, 2006

(65) Prior Publication Data

US 2007/0015048 A1 Jan. 18, 2007

(30) Foreign Application Priority Data

Jul. 13, 2005 (KR) ................... 10-2005-0063018

(51) Int. Cl.
*H01M 6/32* (2006.01)
*H01M 6/30* (2006.01)

(52) U.S. Cl. ..................... 429/118; 429/110

(58) Field of Classification Search ............... None
See application file for complete search history.

(56) References Cited

U.S. PATENT DOCUMENTS

| | | | | |
|---|---|---|---|---|
| 5,260,148 | A * | 11/1993 | Idota ..................... | 429/307 |
| 6,635,387 | B2 * | 10/2003 | Fitter et al. ............. | 429/347 |
| 2005/0042519 | A1 * | 2/2005 | Roh et al. ............... | 429/330 |
| 2005/0142446 | A1 * | 6/2005 | Yamamoto et al. ...... | 429/231.95 |
| 2005/0170253 | A1 * | 8/2005 | Yoon et al. ............. | 429/307 |

* cited by examiner

*Primary Examiner*—Dah-Wei D Yuan
*Assistant Examiner*—Maria J Laios
(74) *Attorney, Agent, or Firm*—Cantor Colburn LLP

(57) ABSTRACT

Provided is a lithium secondary battery comprising a controlled-release capsule which continuously releases a desired amount of additives necessary for electrolytes or electrodes at a constant level and is included in an electrolyte and/or an electrode material, thereby providing inherent effects of additives while simultaneously minimizing adverse side reactions of surplus additives, consequently optimizing the battery performance.

3 Claims, No Drawings

LITHIUM SECONDARY BATTERY CONTAINING CAPSULE FOR CONTROLLED-RELEASE OF ADDITIVES

FIELD OF THE INVENTION

The present invention relates to a lithium secondary battery. More specifically, the present invention relates to a lithium secondary battery comprising a controlled-release capsule which continuously releases a desired amount of additives necessary for an electrolyte or electrode at a constant level and is included in the electrolyte and/or electrode materials, thereby providing inherent effects of additives while simultaneously minimizing adverse side reactions of surplus additives, consequently optimizing the battery performance.

BACKGROUND OF THE INVENTION

Technological development and increased demand for mobile equipment have led to a rapid increase in the demand for secondary batteries as an energy source. Among these secondary batteries, a great deal of research and study has been focused on a lithium secondary battery having high energy density and discharge voltage and thus some of such lithium secondary batteries are commercially available and widely used.

The lithium secondary battery comprises a cathode, an anode, a separator and an electrolyte as electric power-generating elements, and generally a variety of additives. Categories of these additives may be broadly divided into those which are essentially required for the operation process of the battery, and those which are additionally required for securing desired performance and/or stability of the battery. Generally, the former essential additives of the battery are added during preparation (fabrication) of the battery components and the latter additional additives are added during preparing processes of the battery components or during assembly processes of the battery.

Of those additives, additives necessary for securing stability of the battery are required at a certain time point, for example, upon occurrence of over current or high temperature due to abnormal operation of the battery, while some additives are continuously needed at a constant level during the use of the battery. For example, electrolyte additives for improvement of a lifespan exert lifespan-extension effects by the use thereof for formation of a firm solid electrolyte interface (SEI) layer on a surface of an electrode during the initial formation process of the battery or for restoration of the SEI layer partially damaged during repeated charge/discharge processes. Therefore, relatively large amounts of additives are consumed during the initial formation process of the battery, whereas only small amounts of additives are required upon subsequent charge/discharge or prolonged storage. If amounts of additives incorporated into the battery are small and consequently total amounts of additives are completely consumed during the initial formation process of the battery, degradation of the battery lifespan occurs upon subsequent charge/discharge or prolonged storage of the battery. However, if amounts of additives are excessively large, reaction of surplus additives results in occurrence of irreversible capacity or decomposition of surplus additives results in deterioration of battery stability due to generation of gas.

Therefore, there is a need for a novel method capable of inhibiting deterioration of battery performance due to the presence of surplus additives, by minimizing adverse side reactions of surplus additives while also exerting inherent effects of additives, via release of only a necessary amount of additives into the electrolyte or electrode.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have developed, as will be described hereinafter, a controlled-release capsule which releases additives necessary for electrolytes or electrodes at a constant level, and have discovered that incorporation of such a controlled-release capsule into the electrolyte and/or electrode materials can provide inherent effects of additives while simultaneously minimizing adverse side reactions of surplus additives, thereby being capable of maintaining the battery performance in the optimum state. The present invention has been completed based on these findings.

DETAILED DESCRIPTION OF PREFERRED EMBODIMENTS

In accordance with an aspect of the present invention, the above and other objects can be accomplished by the provision of a lithium secondary battery comprising an anode including an anode active material capable of performing reversible storage and release of lithium ions, a cathode including a cathode active material capable of performing reversible storage and release of lithium ions, a porous separator interposed between the anode and cathode, and an electrolyte containing a lithium salt, wherein the electrolyte and/or electrode include a controlled-release capsule containing a material inside microporous a cell, in order to ensure that the material essentially or additionally required in relation to the operation of the battery can be released at a constant level.

As used herein, the phrase "material essentially or additionally required in relation to the operation of the battery" refers to a material that is essentially required for the operation of the battery or is additionally required for desired purposes such as improvement of battery performance and that preferably requires continuous replenishment due to consumption thereof during the operation of the battery. Hereinafter, such a material is also often called "a release material".

As an example of the release material, mention may be made of an electrolyte additive which is necessary for formation and restoration of the SEI layer as described above. Examples of electrolyte additives that can be used in the present invention include, but are not limited to, vinylene carbonate (VC), vinylene ethylene carbonate, fluoro-ethylene carbonate, succinic anhydride, lactide, caprolactam, ethylene sulfite, propane sultone (PS), propene sultone, vinyl sulfone, and derivatives and halogen-substituted compounds thereof. These materials may be used alone or in any combination thereof.

Further, other examples of the release materials may include, but are not limited to, electrolyte additives that inhibit adverse side reactions occurring in the battery, such as ethylenediaminetetraacetic acid, tetramethylethylene diamine, pyridine, dipyridyl, ethylene bis(diphenylphosphine), butyronitrile, succinonitrile, iodine and ammonium halogenate, materials that improve thermal stability of the battery, such as hexamethyldisiloxane, hexamethoxycyclotriphosphazene, hexamethylphosphoramide, cyclohexylbenzene, biphenyl, dimethylpyrrole, and their derivatives. These materials may be used alone or in any combination thereof.

A single material may be contained in the controlled-release capsule or otherwise two or more materials may also be co-contained in the controlled-release capsule, if desired. Further, two or more capsules, in which two or more materials are contained respectively, may be used together.

As used herein, the term "constant level" refers to a level suitable for optimizing the operation state of the battery and may vary depending upon kinds of the release materials. A release level of the release material may be determined depending upon various factors such as the size of the release material, solubility thereof in electrolytes, a pore size of a cell and the like. The preferred release rate of the release material may be in the range of 1 to 10000 μg/day. For example, when vinylene carbonate (VC) is used as the release material, the preferred release rate of VC may be in the range of 10 to 1000 μg/day.

A cell of the controlled-release capsule is composed of an electrolyte-insoluble material which includes, but is not limited to, polyethylene, polypropylene, polystyrene, nylon, polycaprolactone, polyethylene terephthalate, polyurethane, gelatin, chitosan, cellulose and derivatives thereof. These materials may be used alone or in any combination thereof.

The size of pores formed in a cell of the controlled-release capsule may be appropriately adjusted depending upon the release rate of the release material, as discussed hereinbefore.

In order to ensure that pores of the separator are not clogged with the capsule, the size of the controlled-release capsule is preferably smaller than that of the pore of the separator, for example, less than 5 μm.

The controlled-release capsule may be included in the electrolyte or otherwise may be included in the electrode. Alternatively, the controlled-release capsule may be included in both electrolyte and electrode, if necessary. Preferably, the capsule is included in the electrolyte.

Where appropriate, the electrolyte and/or electrode of the battery may also contain materials identical and/or similar to those contained in the controlled-release capsule, in addition to the controlled-release capsule. For example, in the case of an additive which is needed in a relatively large amount during the initial formation process of the battery and is continuously needed in a small amount during subsequent charge/discharge processes, a predetermined amount of the additive may be directly added to the electrolyte, and the remaining parts thereof may be contained in the controlled-release capsule which is then added to the electrolyte and/or electrodes. Whereas, in the case of an additive which is not used during the initial formation process of the battery and is needed in a small amount at a constant level during subsequent charge/discharge processes, the additive may be contained in the controlled-release capsule which is then added to the electrolyte and/or electrodes, instead of separate addition of the additive to the electrolyte and electrode.

Therefore, a lithium secondary battery comprising the controlled-release capsule, which releases additives necessary for the electrolyte or electrode in a desired amount, in the electrolyte and/or electrode materials, can exert inherent effects of the additives and simultaneously can optimize the battery performance due to minimized adverse side reactions of surplus additives.

The controlled-release, porous capsule containing the electrolyte additive components contained therein may be prepared using various conventional methods such as solvent evaporation, coacervation, interfacial polycondensation, in-situ polymerization, piezoelectric process, and spray drying. These methods for preparing the controlled-release, porous capsule are well-known in the related art and therefore detailed description thereof will be omitted. One example of these methods will be illustrated in the following examples.

As discussed hereinbefore, the lithium secondary battery of the present invention is comprised of a cathode, an anode, a separator and a lithium salt-containing, non-aqueous electrolyte compound including the controlled-release capsule.

The cathode is, for example, fabricated by applying a mixture of the cathode active material, a conductive material and a binder to a cathode current collector, followed by drying. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of materials for the cathode current collector, mention may be made of stainless steel, aluminum, nickel, titanium, sintered carbon and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The conductive material is usually added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive oxides such as titanium oxide; and polyphenylene derivatives. Where appropriate, addition of the conductive material may be omitted due to addition of a conductive second coating layer to the cathode active material.

The binder is a component assisting in binding between the active material and conductive material, and in binding with the current collector. The binder utilized in the present invention is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylenepropylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is, for example, fabricated by applying anode materials to an anode current collector, followed by drying. If necessary, other components, as described above, may be further added.

The anode current collector is generally fabricated to have a thickness of 3 to 500 µm. There is no particular limit to materials for the anode current collector, so long as they have suitable conductivity without causing chemical changes in the fabricated battery. As examples of the materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesion to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogens; $0<x\leq1$; $1\leq y\leq3$; and $1\leq z\leq8$); lithium metals; lithium alloys; silicon-based alloys; tin-based alloys; oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte containing a lithium salt is composed of a non-aqueous electrolyte and lithium. As the non-aqueous electrolyte, a non-aqueous electrolytic solution, organic solid electrolyte and inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilizable in the present invention, mention may be made of polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

As examples of the inorganic solid electrolyte utilizable in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary battery of the present invention may be prepared by conventional methods known in the art. That is, the lithium secondary battery can be prepared by disposing a porous separator between the cathode and anode, followed by introduction of an electrolyte thereto.

The cathode can be, for example, fabricated by applying a slurry containing the lithium transition metal oxide active material, conductive material and binder as described above to a current collector, followed by drying. Similar to the cathode, the anode can also be fabricated by applying a slurry containing a carbon active material as described above, a conductive material and a binder to a thin current collector, followed by drying.

There is no particular limit to a structure of the cathode, anode and separator in the lithium secondary battery according to the present invention, and for example, mention may be made of a stacking type or winding type in which each sheet is inserted in a cylinder-, square- or pouch-shaped case.

EXAMPLES

Now, the present invention will be described in more detail with reference to the following examples. These examples are provided only for illustrating the present invention and should not be construed as limiting the scope and spirit of the present invention.

Example 1

1. Preparation of Controlled-Release Capsule

Polystyrene (PS) was dissolved in dichloromethane (DCM) to prepare 25 mL of a dispersion (a). In addition, 250 mL of an aqueous solution (b) was prepared which includes 5% by weight of vinylene chloride (VC) and 0.5% by weight of gelatin as a stabilizer. The dispersion (a) was added to the aqueous solution (b), thereby forming an oil/water emulsion.

Then, DCM was evaporated to obtain a PS capsule containing VC. The thus-obtained PS capsule was washed with distilled water several times, thereby preparing a final capsule.

2. Preparation of Battery

An anode was fabricated by adding 93% by weight of carbon active material (MCMB10-28, Osaka Gas Co., Ltd., Japan) and 7% by weight of polyvinylidene difluoride (PVDF) (Kynar 761, Elf Atochem) to N-methyl-2-pyrrolidone (NMP) as a solvent, mixing the added materials in a mixer (IKA Mixer) for 2 hours and coating the resulting mixture on a copper foil current collector, followed by drying at 130° C.

A cathode was fabricated by adding 91% by weight of $LiCoO_2$, 3% by weight of PVDF (Kynar 761) and 6% by weight of conductive carbon (KS-6, Lonza) to N-methyl-2-pyrrolidone (NMP) as a solvent, mixing the added materials in a mixer (IKA Mixer) for 2 hours and coating the resulting mixture on an aluminum foil current collector, followed by drying at 130° C.

Then, a separator (celgard 2400, Hoechst Celanese) was interposed between the anode and cathode thus fabricated as above, thereby preparing a pouch-type cell. A lithium secondary battery was fabricated by injecting thereto a solution of 1M $LiPF_6$ in EC/EMC as an electrolyte solution, and 2% by weight of VC and an electrolyte including 5% by weight of a VC-contained, controlled-release capsule, as additives.

Example 2

A battery was fabricated in the same manner as in Example 1, except that a VC-contained, controlled-release capsule was included in an anode.

Comparative Example 1

A battery was fabricated in the same manner as in Example 1, except that an electrolyte solution containing no controlled-release capsule was used.

Comparative Example 2

A battery was fabricated in the same manner as in Example 1, except that an added amount of VC was increased to 4% by weight and an electrolyte solution containing no controlled-release capsule was used.

Experimental Example

1. Evaluation of Lifespan Characteristics

In order to evaluate lifespan characteristics, batteries prepared in Examples 1 and 2 and Comparative Examples 1 and 2 were respectively subjected to 200 charge/discharge cycles at a current density of 0.5 C and a temperature of 45° C. The percent retention of discharge capacity of the battery upon 100 and 200 repeated charge/discharge cycles was calculated relative to the percent retention of discharge capacity upon one charge/discharge cycle. The results thus obtained are shown in Table 1 below.

2. Evaluation of High-Temperature Storage Characteristics

In order to evaluate high-temperature storage characteristics, batteries prepared in Examples 1 and 2 and Comparative Examples 1 and 2 were respectively subjected to full charging, followed by storage at 60° C. for 6 hours, and increases in thicknesses of batteries were measured. The results thus obtained are shown in Table 1 below.

TABLE 1

| | Electrolyte additives | | % discharge capacity upon 100 and 200 cycles, vs 1-cycle discharge capacity | | Thickness increase after 6-hr storage at |
| --- | --- | --- | --- | --- | --- |
| | (wt %) | VC-contained capsule | 100 cycles | 200 cycles | 60° C. (mm) |
| Ex. 1 | VC 2% | Added (Electrolyte solution) | 91 | 81 | 0.53 |
| Ex. 2 | VC 2% | Added (Anode) | 90 | 82 | 0.51 |
| Comp. Ex. 1 | VC 2% | None | 93 | 61 | 0.48 |
| Comp. Ex. 2 | VC 4% | None | 91 | 84 | 1.7 |

As can be seen from Table 1, batteries of Examples 1 and 2 to which 2% by weight of VC and a VC-contained capsule were respectively added to electrolytes and anodes, and the battery of Comparative Example 2 to which 4% by weight of VC was added directly exhibited a high capacity retention rate, as compared to the battery of Comparative Example 1 to which 2% by weight of VC alone was added directly. Therefore, it can be seen from these results that more than 2% by weight of VC is needed for performing more than 200 charge/discharge cycles.

In addition, it can be seen that relatively small increases in thicknesses of batteries were observed in batteries of Examples 1 and 2 to which 2% by weight of VC-contained capsules were respectively added to electrolyte and anode, unlike the battery of Comparative Example 2 to which 4% by weight of VC was added directly, even though the same content of 4% by weight of VC was added therebetween, and in the battery of Comparative Example 1 to which 2% by weight of VC alone was added directly. This is because the battery of Comparative Example 2 to which an excessive amount of VC was directly added from the beginning releases large amounts of gas due to decomposition of surplus VC at a high temperature.

From the above results for evaluation of lifespan characteristics and high-temperature storage characteristics, it can be seen that batteries of Examples 1 and 2, in which a concentration of VC in the electrolyte was maintained at a proper level via partial addition of VC-contained capsules, exert excellent characteristics.

INDUSTRIAL APPLICABILITY

As apparent from the above description, it can be seen that a lithium secondary battery according to the present invention provides inherent effects of additives while simultaneously optimizing the battery performance due to minimized adverse side reactions of surplus additives, via inclusion of a controlled-release capsule, which releases additives necessary for electrolytes or electrodes at a desired constant level, in the electrolyte and/or electrode material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising an anode including an anode active material capable of performing reversible storage and release of lithium ions, a cathode including a cathode active material capable of performing reversible storage and release of lithium ions, a porous separator interposed between the anode and cathode, and an electrolyte containing a lithium salt, wherein the electrolyte and/or electrode include a controlled-release capsule containing a release material inside a microporous cell, such that the release material essentially required in relation to the operation of the battery can be controllably released, wherein the microporous cell of the controlled-release capsule is composed of an electrolyte-insoluble material which is at least one selected from the group consisting of polyethylene, polypropylene, polystyrene, nylon, polycaprolactone, polyethylene terephthalate, polyurethane, gelatin, chitosan, and cellulose;

wherein the size of the controlled-release capsule is less than 5 μm within the range of being smaller than the size of pores of the separator, wherein a material identical to the release material contained in the controlled-release capsule is contained in the electrolyte and/or electrode, in addition to the controlled-release capsule;

wherein the release material is a material necessary for formation and restoration of a solid electrolyte interface (SEI) layer, and is at least one selected from the group consisting of vinylene carbonate (VC), vinylene ethylene carbonate, fluoro-ethylene carbonate, succinic anhydride, lactide, caprolactam, ethylene sulfite, propane sultone (PS), propene sultone, vinyl sulfone, and halogen-substituted compounds thereof; and wherein the release material is released in a rate of 1 to 10000 μg/day.

2. The battery according to claim 1, wherein two or more capsules having two or more materials contained therein are used together.

3. The battery according to claim 1, wherein the controlled-release capsule is prepared by solvent evaporation, coacervation, interfacial polycondensation, in-situ polymerization, piezoelectric process, or spray drying.

* * * * *